(12) United States Patent
Sybert et al.

(10) Patent No.: US 10,618,223 B2
(45) Date of Patent: Apr. 14, 2020

(54) SACRIFICIAL HIGH HEAT SUPPORT MATERIALS FOR ADDITIVE MANUFACTURING PROCESSES

(71) Applicant: SABIC GLOBAL TECHNOLOGIES B.V., Bergen op Zoom (NL)

(72) Inventors: Paul Dean Sybert, Evansville, IN (US); Malvika Bihari, Evansville, IN (US); Robert Russell Gallucci, Mt. Vernon, IN (US); Keith E. Cox, Newburgh, IN (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/330,793

(22) PCT Filed: Sep. 12, 2017

(86) PCT No.: PCT/US2017/051068
§ 371 (c)(1),
(2) Date: Mar. 6, 2019

(87) PCT Pub. No.: WO2018/049365
PCT Pub. Date: Mar. 15, 2018

(65) Prior Publication Data
US 2019/0193336 A1 Jun. 27, 2019

Related U.S. Application Data

(60) Provisional application No. 62/393,298, filed on Sep. 12, 2016.

(51) Int. Cl.
*B29C 64/40* (2017.01)
*B33Y 70/00* (2020.01)
(Continued)

(52) U.S. Cl.
CPC ............ *B29C 64/40* (2017.08); *B29C 64/118* (2017.08); *B33Y 10/00* (2014.12); *B33Y 70/00* (2014.12);
(Continued)

(58) Field of Classification Search
None
See application file for complete search history.

(56) References Cited

U.S. PATENT DOCUMENTS 5,503,785 A 4/1996 Crump
5,856,486 A 1/1999 Pickett
(Continued)

FOREIGN PATENT DOCUMENTS

EP 0524731 A1 1/1993
EP 0900823 A2 3/1999
(Continued)

OTHER PUBLICATIONS

International Patent Application No. PCT/US2017/051068; Int'l Search Report and the Written Opinion; dated Dec. 11, 2017; 11 pages.
International Patent Application No. PCT/US2017/051068; Int'l Preliminary Report on Patentability; dated Mar. 21, 2019; 7 pages.

*Primary Examiner* — Monica A Huson
*Assistant Examiner* — Kelsey C Grace
(74) *Attorney, Agent, or Firm* — BakerHostetler

(57) ABSTRACT

Disclosed herein are methods that includes using a water-degradable (e.g., autoclavable) support material together with a high-heat build material (e.g., polyetherimide or PEI). When the support material is autoclaved for a period of time, the support material becomes brittle and then disintegrates into powder and therefore can be removed from the model or build material, leaving behind a part formed from the model material that includes features (e.g., cavities, channels, etc.) formerly occupied by the support material.

15 Claims, 1 Drawing Sheet

(51) Int. Cl.
  *B33Y 10/00* (2015.01)
  *B29C 64/118* (2017.01)
  *D01F 6/64* (2006.01)
  *D01F 1/10* (2006.01)
  *B29K 69/00* (2006.01)

(52) U.S. Cl.
  CPC ............... *D01F 1/10* (2013.01); *D01F 6/64* (2013.01); *B29K 2069/00* (2013.01); *B29K 2869/00* (2013.01)

(56) References Cited

U.S. PATENT DOCUMENTS

| | | |
|---|---|---|
| 6,723,864 B2 | 4/2004 | Silva et al. |
| 8,633,265 B2 | 1/2014 | Hurst et al. |
| 8,822,590 B2 | 9/2014 | Hermes |
| 2003/0004600 A1 | 1/2003 | Priedeman |
| 2004/0039145 A1 | 2/2004 | Silva et al. |
| 2015/0028523 A1 | 1/2015 | Jaker |
| 2015/0376373 A1 | 12/2015 | Shoji |
| 2016/0122541 A1 | 5/2016 | Jaker |

FOREIGN PATENT DOCUMENTS

| | | |
|---|---|---|
| EP | 1105828 B1 | 6/2004 |
| JP | H11-172095 A | 6/1999 |
| KR | 2013-0079539 A | 7/2013 |
| WO | 2010045147 A2 | 4/2010 |
| WO | WO 2012/058278 A2 | 5/2012 |

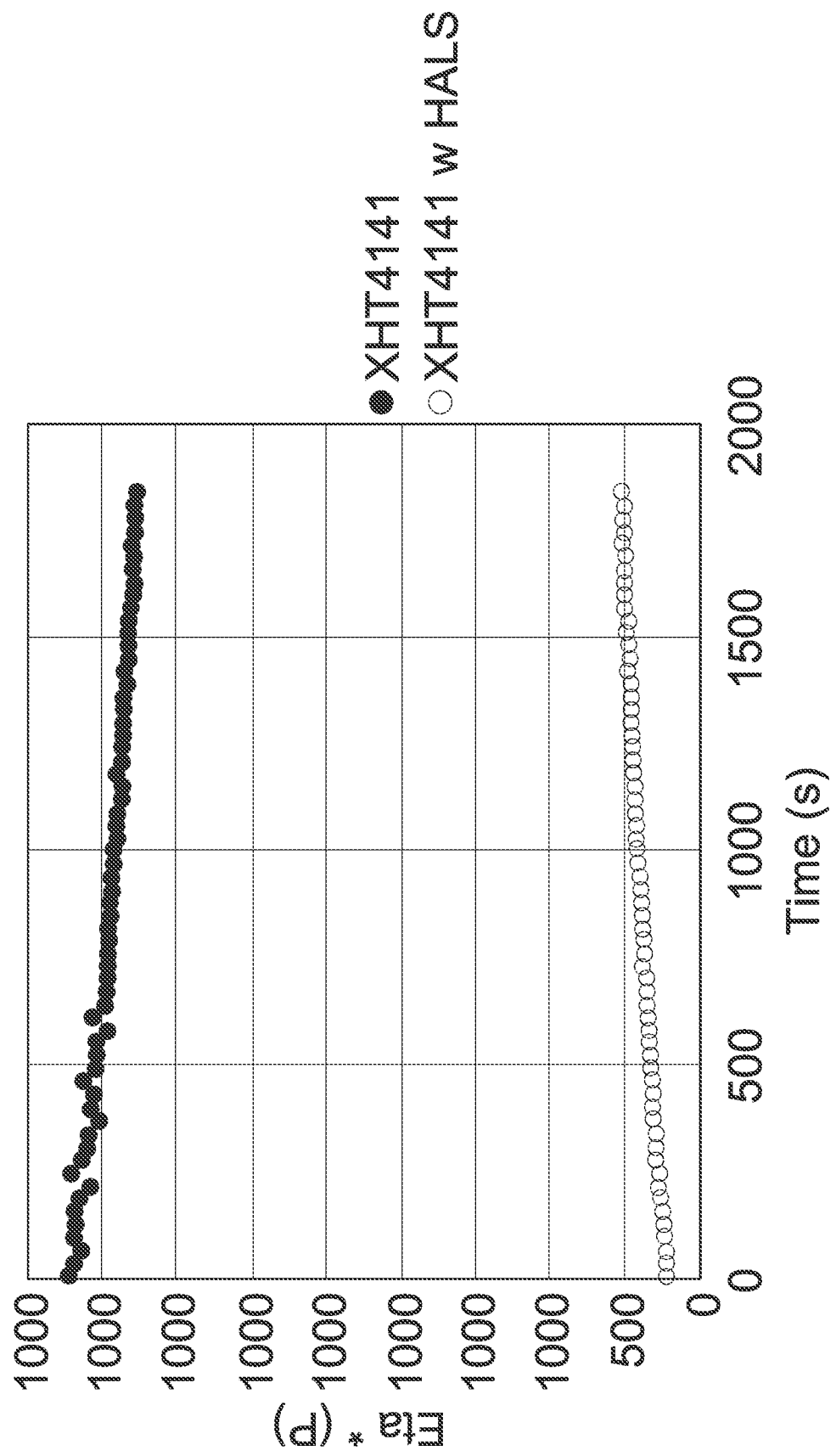

SACRIFICIAL HIGH HEAT SUPPORT MATERIALS FOR ADDITIVE MANUFACTURING PROCESSES

CROSS-REFERENCE TO RELATED APPLICATION

This application is the National Stage of International Application No. PCT/US2017/051068, filed Sep. 12, 2017, which claims the benefit of U.S. Provisional Application No. 62/393,298 filed Sep. 12, 2016, the disclosures of which are incorporated herein by this reference in their entireties.

TECHNICAL FIELD

The present disclosure relates to the field of additive manufacturing and also to the field of degradable polymeric materials.

BACKGROUND

Because of their versatility and broad application, additive manufacturing processes have been gaining in popularity. In some aspects, additive manufacturing processes feature the formation of workpieces that include a build material and a sacrificial material; the sacrificial material is removed after manufacture so as to leave behind a detailed part made of the build material that includes supports or other cavities where the sacrificial material existed before removal.

Fused deposition modeling and fused filament fabrication are additive manufacturing technologies that use thermoplastic filaments or even metal wires to build parts layer by layer. The material from a spool is fed by an extrusion nozzle that is heated to melt the material which is then deposited by a controlled mechanism in horizontal and vertical directions. The machine deposits a build material and a support material, the support material being removed after the part is built. The support material is a sacrificial material that can be characterized as being a "breakaway" or "soluble" material.

Such additive manufacturing processes, however, have not yet achieved the ability to form workpieces that include a build material that has a high tolerance for heat while at the same time also including a sacrificial material that may be efficiently removed from the build material. As one example, support materials for polyetherimide (PEI) are so-called breakaway support materials that are based on polyarylethersulfone (227° C. Tg) or polysulfone (190° C. Tg).

It is difficult, however, to remove these support materials from model/build materials, and removal may require mechanical removal or agitation, often with significant hand labor. For some geometries, it may be difficult or even impossible to completely remove the support materials.

These and other shortcomings are addressed by aspects of the present disclosure.

SUMMARY

In meeting these long-felt needs, aspects of the disclosure relate to a method, comprising:
with an additive manufacturing process, forming a workpiece that comprises
a build portion comprising polyetherimide, polyetherimide sulfone, polyimide, polysulfone, polyether sulfone, polyphenylene ether sulfone, polyphenylene ether, imidized polymethacrylate, blends thereof, or any combination thereof, and
a degradable support portion contacting the build portion, the degradable support portion comprising a thermoplastic polycarbonate and a hindered amine light stabilizer; and
exposing the workpiece to water at a temperature of from 85 degrees Celsius (° C.) to a temperature that corresponds to a glass transition temperature (Tg) of the build portion for a time sufficient to selectively degrade at least a region of the degradable support portion.

Aspects of the disclosure further relate to a workpiece, comprising: a build portion comprising polyetherimide, polyetherimide sulfone, polyimide, polysulfone, polyether sulfone, polyphenylene ether sulfone, polyphenylene ether, imidized polymethacrylate, blends thereof, or any combination thereof; and a degradable support portion contacting the build portion. The degradable support portion comprises a polycarbonate having a Tg of from 130 to 280° C. and from 0.1 to 3.0 wt % hindered amine light stabilizer.

Other aspects of the disclosure relate to a filament comprising a polycarbonate and a hindered amine light stabilizer.

Particular aspects of the disclosure relate to a degradable support structure comprising a plurality of layers of additively manufactured material, the plurality of layers of additively manufactured material comprising a polycarbonate and a hindered amine light stabilizer.

BRIEF DESCRIPTION OF THE DRAWING

FIG. 1 provides melt stability studies at 330° C. for exemplary copolymer and copolymer-HALS samples over the given time periods.

DETAILED DESCRIPTION OF ILLUSTRATIVE EMBODIMENTS

The present disclosure may be understood more readily by reference to the following detailed description of desired embodiments and the examples included herein. In the following specification and the claims that follow, reference will be made to a number of terms which have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

In meeting the long-felt needs described herein, the present disclosure provides a technology that includes a water-degradable (e.g., autoclavable) support material for a high-heat build material (e.g., polyetherimide or PEI, polysulfones, polyethersulfones). In some instances, the high heat build material may have a Tg of from 170 to 280 degrees Celsius (° C.) and/or a Tm (crystalline melting point) from 200 to 400° C. These high Tg build resins include a support resin with similar thermal capability in order that parts do not sag while being fabricated. After part building, it is desirable to have a high heat support that can be conveniently removed. The support material may have sufficient melt stability to be formed into a filament and fabricated into a part along with the build resin and then be removed. Described herein for the high Tg build resin is a combination of high Tg polycarbonates with hindered amines that satisfy this need; after part and support build is complete, the support can be selectively removed by exposure to water at high temperature. The water may be in any suitable form, including liquid, vapor or steam form. A variety of hindered amines are available. Many examples can be found as hindered amine light stabilizer (HALS). For example when the support material is autoclaved (e.g., at 115° C.) for a period of time, the support material becomes brittle and then disintegrates into a low melting liquid or powder and therefore can be removed from the model or build material, leaving behind a part formed from the model (build) material that includes features (e.g., cavities, channels) formerly occupied by the support material. As used herein, a "filament" refers to single strand of manufactured (e.g. extruded or deposited) material, and may be used interchangeably with the term "monofilament." When grouped in multiple strands, filament/monofilament is often referred to as multifilament.

One nonlimiting example of a high Tg build resin is ULTEM™ (SABIC) polyetherimide (PEI); PEI is a comparatively high temperature (Tg of from about 200 to about 300° C.) and high heat polymer that is suitable as a build material for FDM. PEI is also used in blends with other thermoplastics, e.g., polycarbonates; exemplary blends thereof may have a Tg of about 175 to 185° C. Thus, a support or sacrificial material used with PEI should be able to withstand PEI's high extrusion temperature. Other exemplary high heat build resins include polysulfones, polyether sulfones, polyphenylene oxide, polyarylates, polycarbonates (Tg about 145° C.) and crystalline resins (Tm> about 200° C.) such as polyamides, polyesters, polyaryl ether ketones, such as PAEK and PEEK, as well as blends of high heat crystalline and amorphous resins.

Isoindolinone bisphenol homopolymers of PPP-BP and high PPP-BP content copolymers (e.g., polycarbonates and polycarbonate copolymers) and isophorone bisphenol polycarbonates have a comparatively high Tg compared to BPA-PC. Addition of certain additives, e.g., hindered amine light stabilizers (HALS) accelerates hydrolysis and subsequent degradation of polycarbonates, making the polycarbonate brittle and powdery after 5-10 hours of autoclaving. After autoclaving, the parts may be put in an ultrasonic bath or other agitation device after removal from the autoclave and cooling to aid removal of the residue from tight places, though this is not a requirement. In some aspects, exposure to heated water is sufficient to degrade the support material in the part. A part may be autoclaved in an orientation such that degraded support material is encouraged out of the part by gravity.

While in the presence of steam, the HALS additive readily degrades the high Tg PC, but the HALS additives do not substantially disturb the high heat PC melt stability and allow high temperature (> about 250° C.) melt processing to make the HALS blend, extrude the HALS containing PC filament and then make the support structure. The HALS-PC blend thus accommodates three melt heat histories; compounding, filament extrusion and scaffold/part build with minimal decomposition and then, after part build is complete, degrade quickly in steam. Other additives would not permit melt processability of the PC before the disclosed step of moisture exposure/autoclave treatment.

Polycarbonates

"Polycarbonate" as used herein means a polymer or copolymer having repeating structural carbonate units of formula (1)

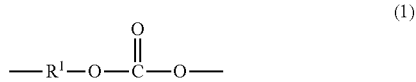

(1)

wherein at least 60 percent of the total number of $R^1$ groups is aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

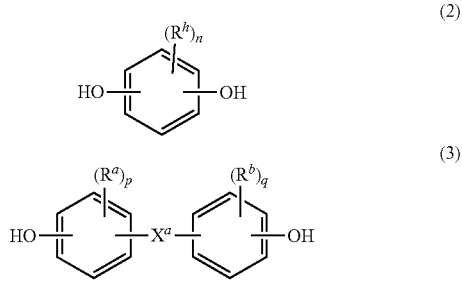

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an aspect, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2', 6,6'-tetrabromo-4,4'-isopropylidenediphenol (2,2-bis(3,5-dibromo-4-hydroxyphenyl)propane (TBBPA) 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxy-dibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Especially suitable copolycarbonates and polyestercarbonates include the following monomers:

(a) a bisphenol A divalent group of the formula

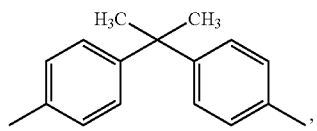

and (b) a $C_{16}$ or higher divalent group (b) of the formula

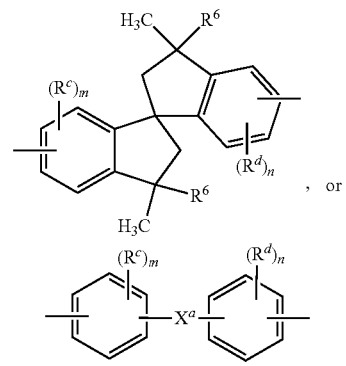

wherein $R^c$ and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or polycycloalkylidene, a -($Q^1$)$_x$-G-($Q^2$)$_y$- group wherein $Q^1$ and $Q^2$ are each independently a $C_{1-3}$ alkylene, G is a $C_{3-10}$ cycloalkylene, x is 0 or 1, and y is 1, and m and n are each independently 0 to 4, and or (c) a $C_{16}$ or higher divalent group (b1), (b2), or (b1) and (b2), wherein (b1) is a phthalimidine divalent group of the formula

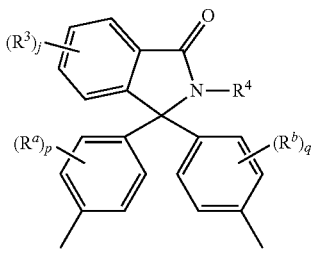

wherein $R^a$ and $R^b$ are each independently a $C_{1-12}$ alkyl, $C_{1-12}$ alkenyl, $C_{3-8}$ cycloalkyl, or $C_{1-12}$ alkoxy, each $R^3$ is independently a $C_{1-6}$ alkyl, $R^4$ is hydrogen, $C_{1-6}$ alkyl, or phenyl optionally substituted with 1 to 5 $C_{1-6}$ alkyl groups, preferably wherein $R^4$ is hydrogen, methyl, or phenyl, preferably hydrogen, methyl, or phenyl, p, q, and j are each independently 0 to 4, preferably 0.

Also included are polyestercarbonates where the bisphenols ($R^1$ and J are each independently selected from the bisphenols listed above) and also poly(ester-carbonate) copolymers comprising:

(a) carbonate units of the formula

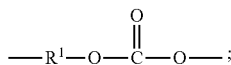

and
(b) ester units of the formula

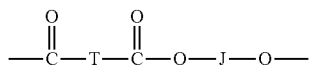

wherein: T is a $C_{2-20}$ alkylene, a $C_{6-20}$ cycloalkylene, or a $C_{6-20}$ arylene.

Specific dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), specifically linear $C_{8-12}$ aliphatic dicarboxylic acid such as decanedioic acid (sebacic acid), 1,6-cyclohexane dicarboxylic acid, and alpha, omega-$C_{12}$ dicarboxylic acids such as dodecanedioic acid (DDDA). Aromatic dicarboxylic acids that can be used include terephthalic acid, isophthalic acid, naphthalene dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1, specifically, 10:90 to 90:10, more specifically, 25:75 to 75:25, or from 2:98 to 15:85.

Other especially useful specific polycarbonates that can be used include poly(ester-carbonate)s comprising bisphenol A carbonate units, and/or phthalimidine carbonate units and isophthalate-terephthalate-bisphenol A, and/or phthalimidine ester units, also commonly referred to as poly(carbonate-ester)s (PCE) or poly(phthalate-carbonate)s (PPC) depending on the relative ratio of carbonate units and ester units and bisphenols used.

The composition may comprise at least one (preferably, 1 to 5) poly(siloxane-carbonate) copolymer, also referred to as a poly(siloxane-carbonate). The polydiorganosiloxane (also referred to herein as "polysiloxane") blocks comprise repeating diorganosiloxane units as in formula (4)

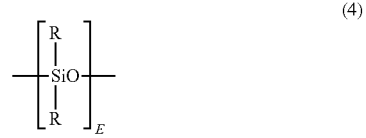

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an aspect, where a transparent poly(siloxane-carbonate) is desired, R is unsubstituted by halogen. Combinations of the foregoing R groups can be used in the same copolymer.

The value of E in formula (4) can vary widely depending on the type and relative amount of each component in the thermoplastic composition, the desired properties of the composition, and like considerations. Generally, E has an average value of 2 to 1,000, specifically 2 to 500, 2 to 200, or 2 to 125, 5 to 80, or 10 to 70. In an aspect, E has an average value of 10 to 80 or 10 to 40, and in still another aspect, E has an average value of 40 to 80, or 40 to 70. Where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used.

A combination of a first and a second polycarbonate-polysiloxane copolymers can be used, wherein the average value of E of the first copolymer is less than the average value of E of the second copolymer.

In an aspect, the polydiorganosiloxane blocks are of formula (5)

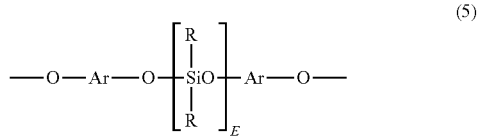

wherein E is as defined above; each R can be the same or different, and is as defined above; and Ar can be the same or different, and is a substituted or unsubstituted $C_6$-$C_{30}$ arylene, wherein the bonds are directly connected to an aromatic moiety. Ar groups in formula (5) can be derived from a $C_6$-$C_{30}$ dihydroxyarylene compound, for example a dihydroxyarylene compound of formula (3) or (6) above. dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

In another aspect, polydiorganosiloxane blocks are of formula (6)

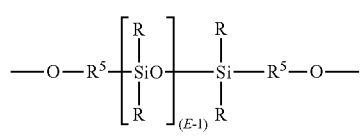

(6)

wherein R and E are as described above, and each $R^5$ is independently a divalent $C_1$-$C_{30}$ organic group, and wherein the polymerized polysiloxane unit is the reaction residue of its corresponding dihydroxy compound. In a specific aspect, the polydiorganosiloxane blocks are of formula (7):

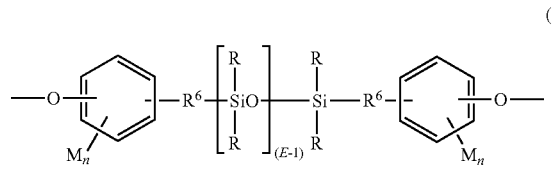

(7)

wherein R and E are as defined above. $R^6$ in formula (14) is a divalent $C_2$-$C_8$ aliphatic. Each M in formula (14) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an aspect, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, R is methyl, M is methoxy, n is one, $R^6$ is a divalent $C_1$-$C_3$ aliphatic group. Specific polydiorganosiloxane blocks are of the formulas (8a-c):

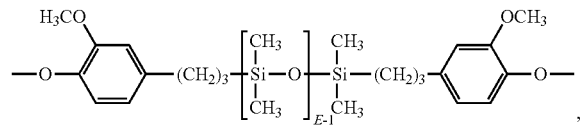

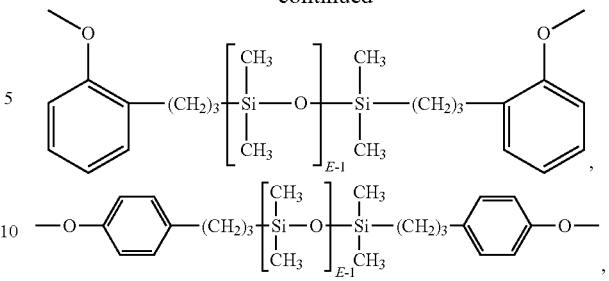

or a combination comprising at least one of the foregoing, wherein E has an average value of 2 to 200, 2 to 125, 5 to 125, 5 to 100, 5 to 50, 20 to 80, or 5 to 20.

Blocks of formulas (8a-c) can be derived from the corresponding dihydroxy polydiorganosiloxane, which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. The poly(siloxane-carbonate) can then be manufactured, for example, by the synthetic procedure of European Patent Application Publication No. 0524731A1 of Hoover, page 5, Preparation 2.

Transparent poly(siloxane-carbonate) comprise carbonate units (1) derived from bisphenol A, and repeating siloxane units (8a), (8b), (8c), or a combination comprising at least one of the foregoing (specifically of formula 8a), wherein E has an average value of 4 to 50, 4 to 15, specifically 5 to 15, more specifically 6 to 15, and still more specifically 7 to 10. The transparent copolymers can be manufactured using one or both of the tube reactor processes described in U.S. Patent Application No. 2004/0039145A1 or the process described in U.S. Pat. No. 6,723,864 can be used to synthesize the poly(siloxane-carbonate) copolymers.

In particular aspects the polycarbonate includes an isoindolinone bisphenol polycarbonate copolymer, a polyester carbonate copolymer, a trimethyl cyclohexyl bisphenol carbonate copolymer, a tetrabromo bisphenol A polycarbonate copolymer, blends thereof, or any combination thereof The poly(siloxane-carbonate) can comprise 50 to 99 weight percent (wt %) of carbonate units and 1 to 50 wt % siloxane units. Within this range, the polyorganosiloxane-polycarbonate copolymer can comprise 70 to 98 wt %, more specifically 75 to 97 wt % of carbonate units and 2 to 30 wt %, more specifically 3 to 25 wt % siloxane units.

In an aspect, the poly(siloxane-carbonate) comprises 10 wt % or less, specifically 6 wt % or less, and more specifically 4 wt % or less, of the polysiloxane based on the total weight of the poly(siloxane-carbonate) copolymer, and are generally optically transparent. In another aspect, the poly(siloxane-carbonate) copolymer comprises 10 wt % or more, specifically 12 wt % or more, and more specifically 14 wt % or more, of the polysiloxane copolymer based on the total weight of the poly(siloxane-carbonate) copolymer, are generally optically opaque.

It is explicitly contemplated that the poly(siloxane-carbonate) includes polymers which further comprise ester units as described above.

The at least one (preferably, 1 to 5) poly(siloxane-carbonate) can have a combined weight average molecular weight of 15,000 to 35,000 as determined by GPC using polycarbonate standards. Within this range the combined weight average molecular weight can be greater than or equal to 20,000. Also within this range the combined weight average molecular weight can be less than or equal to 33,000.

Poly(siloxane-carbonate) can have a melt flow index of 30 to 75 grams/10 minutes (g/10 min), when measured according to ASTM D1238-04 at 300° C. and 1.2 kilograms. Within this range the melt flow index, some aspects can have a melt flow index of 33 to 60 g/10 min. Other aspects can have a melt flow index of 35 to 50 g/10 min.

Branched polycarbonates are also useful, as well as blends of a linear polycarbonate and branched polycarbonate. The branched polycarbonates can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxy phenyl)isopropyl)benzene), tris-phenol PA (4(4(1,1-bis(p-hydroxy phenyl)ethyl) alpha, alpha-dimethyl benzyl)phenol), 4-chloroformyl phthalic anhydride, trimesic acid and isatin bisphenol. The branching agents can be added at a level of 0.05 wt % to 6.0 wt %.

The polycarbonates of the present disclosure may be provided as homopolymers comprising repeat carbonate units derived from a single aromatic dihydroxy monomer. Alternatively, in other aspects, the polycarbonates of the instant disclosure can be co-polycarbonates. As will be understood, such co-polycarbonates will comprise repeating carbonate units derived from two or more aromatic dihydroxy monomers as described herein. In still further aspects, the polycarbonates of the instant disclosure can be co-poly(ester carbonates). As will be understood, such co-poly(ester carbonates) can comprise repeating ester units derived from two or more dicarboxylic acid monomers as described herein.

Exemplary bisphenol monomers to prepare high Tg PC include: 3,3-bis(4-hydroxyphenyl)-2-phenylisoindolin-1-one (PPPBP, an example of an isoindolinone bisphenol); or 1,1-bis(4-hydroxyphenyl)-1-phenyl-ethane (bisphenol-AP); fluorenone bisphenols, tetra methyl bisphenol A, cyclododecyl bisphenols, and 1,1-bis(4-hydroxyphenyl)-3,3,5-trimethylcyclohexane) (bisphenol TMC, an example of an isophorone bisphenol), tetrabromo bisphenol A, alone, in combination with other bisphenols, such as BPA, or in any combination. Bisphenol TMC, an example of an isophorone bisphenol, is used commercially in the APEC Copolymers from Covestro which may be used in the disclosures described herein.

Conventional polymerization processes for manufacturing polycarbonates commonly employ the use of a chain stopper (also referred to as an end capping agent) during the polymerization reaction. The chain stopper limits molecular weight growth rate, and thus can be used to control molecular weight in the polycarbonate. According to some aspects, disclosed polycarbonates can have molecular weights in the range of from 3,000 to 80,000 Daltons. The disclosed polycarbonate and co-polycarbonate compositions can have any desired molecular weight. For example, disclosed polycarbonates can have weight average molecular weights in the range of from 3,000 to 80,000 Daltons, including exemplary molecular weights of 5,000, 7,000, 10,000, 15,000, 20,000, 25,000, 30,000, 35,000, 40,000 and 45,000, 50,000, 55,000, 60,000, 65,000, 70,000 and 75,000 Daltons.

In still further examples, the molecular weight of a disclosed polycarbonate can be in a range of from any one of the above mentioned values to any other of the above mentioned values. For example, molecular weight of a disclosed polycarbonate can be in the range of from 3,000 to 80,000 Daltons using polycarbonate standards.

In still a further example, the molecular weight of a disclosed polycarbonate can be expressed as a value less than any one of the above disclosed values or, alternatively, can be expressed as a value greater than any one of the above disclosed values. For example, the molecular weight of a disclosed polycarbonate can be greater than 3,000 Daltons, or less than 80,000 Daltons. Weight average molecular weight (Mw) determinations may be performed using GPC using a cross linked styrene-divinyl benzene column, at a sample concentration of 1 milligram per milliliter (mg/ml), and as calibrated with bisphenol A homopolycarbonate standards. Samples were eluted at a flow rate of 1.0 milliliter per minute (ml/min) with methylene chloride as the eluent.

Exemplary Hindered Amine Light Stabilizers (HALS)

A variety of HALS may be used in the disclosed technology, including those mentioned in U.S. Pat. No. 8,633,265, which is incorporated herein in its entirety for any and all purposes. Some illustrative HALS examples include (without limitation), the following:

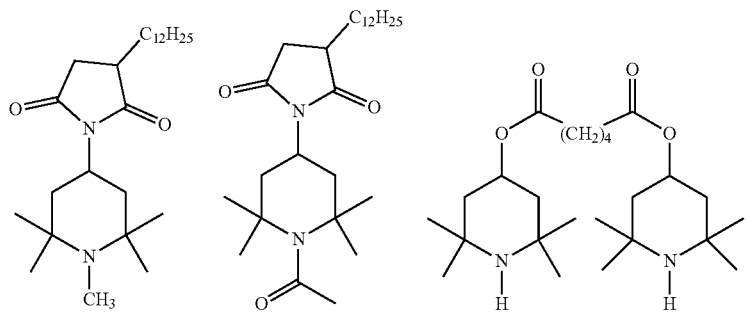

-continued
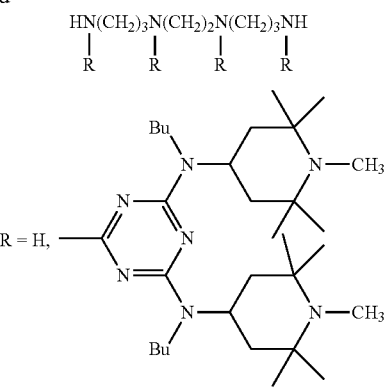
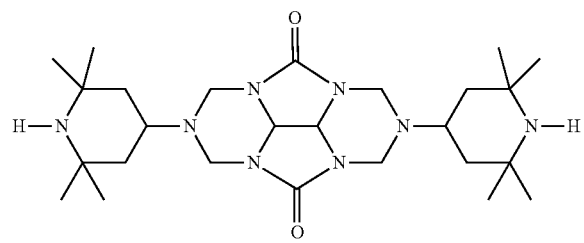
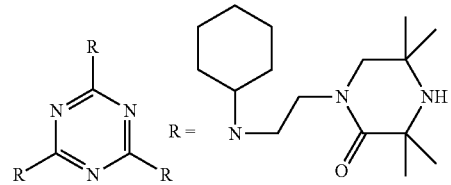
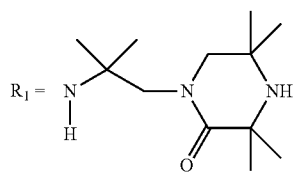
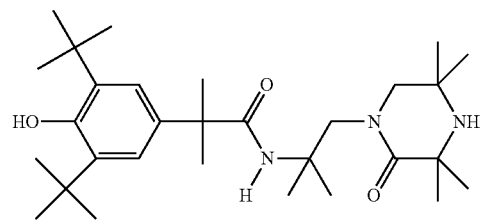
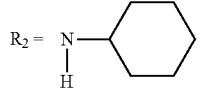
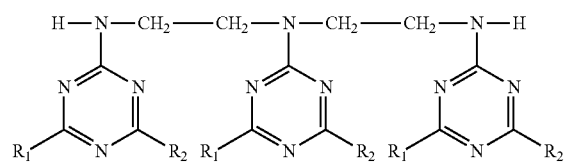
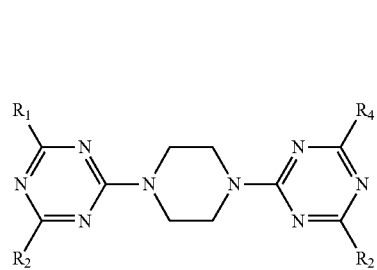
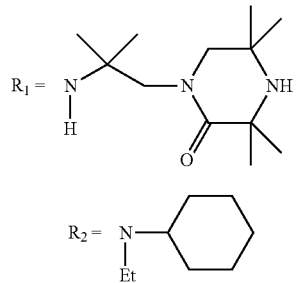
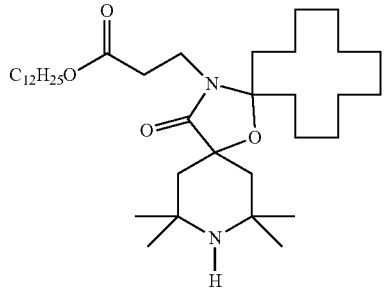
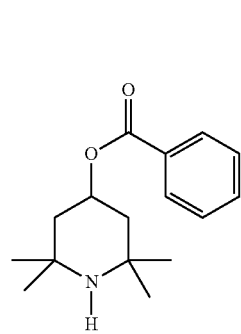
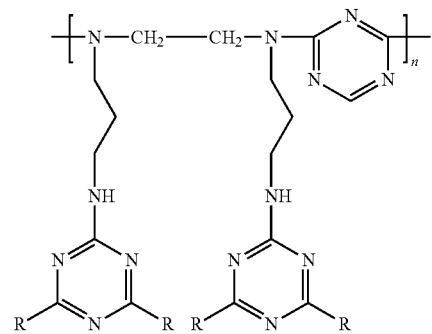
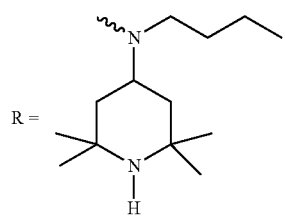

-continued
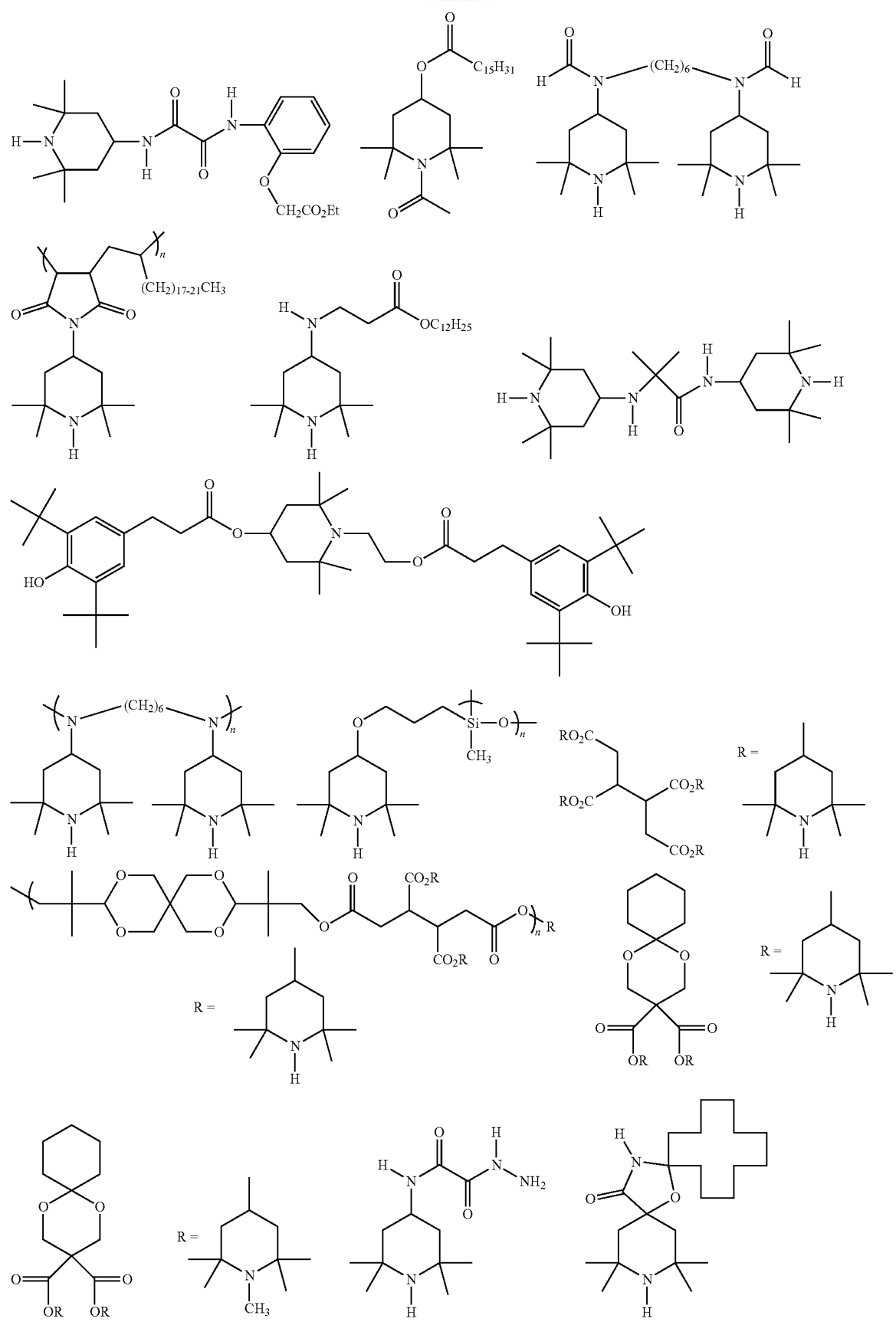

-continued

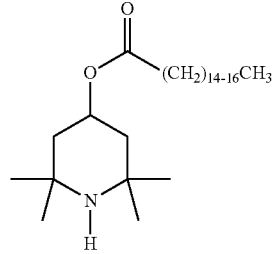
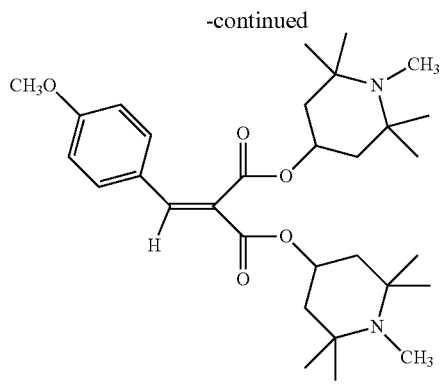
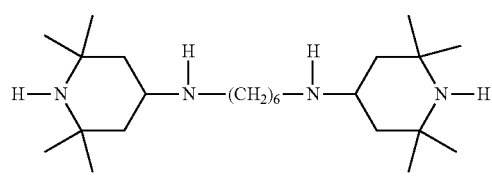
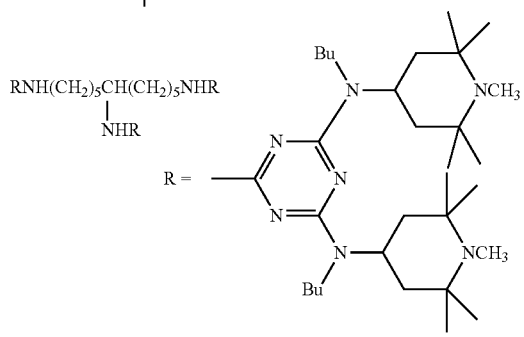
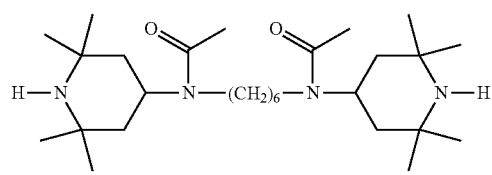
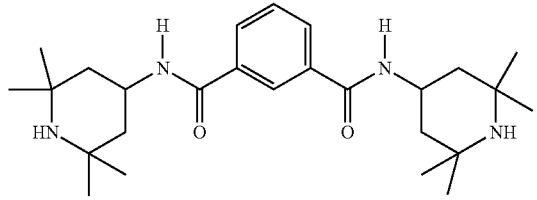
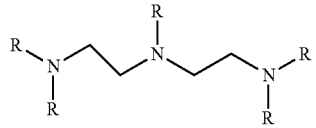
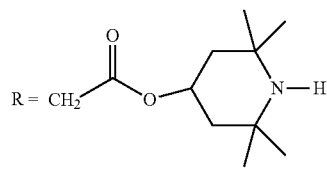
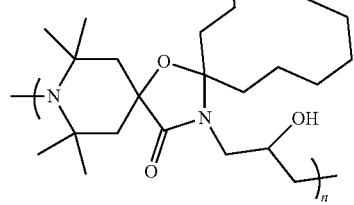

In some aspects the hindered amine light stabilizer has a 2,2,6,6,-tetramethyl-4-piperidyl functionality. One particular HALS compound having 2,2,6,6,-tetramethyl-4-piperidyl functionality suitable for use in aspects of the present disclosure is Tinuvin® 770 (bis(2,2,6,6,-tetramethyl-4-piperidyl)sebaceate, CAS number 52829-07-9), available from BASF.

HALS compounds may be present with the high Tg PC at from 0.1 to 10.0 wt %. In specific aspects HALS may be present with the high Tg PC at from 0.1 to 3 wt %, or from 0.2 to 1 wt %, or from 0.3 to 0.7 wt %. To facilitate retention in the high heat polycarbonate during melt processing, HALS may have a molecular weight of over 200 grams per mole (g/mol), and in some instances the molecular weight may be ≥300 g/mol. HALS having a molecular weight of from about 200-300 g/mol are considered especially suitable.

In some instances, it may be desirable to have a support material that does not drool from the nozzle during part build (e.g., building via a manufactured-for-design or MFD process). This can be achieved by increasing the low shear viscosity, or melt strength of the high Tg PC-HALS blend. This can be achieved in several ways: branching on the high Tg PC resin, blending the high Tg PC resin with a branched BPA polycarbonate resin, adding particulate fillers, such as silica or fiber glass, or other additives to give the HALS blend more melt strength.

Melt strength and low shear viscosity to reduce drooling in HALS high Tg PC blends can also be increased, for example, by addition on multifunctional epoxies such as Novolac™, BPA or bis cycloaliphatic epoxies. Fluoropolymers, such as fibular PTFE, can also be used to enhance melt strength.

Routes to enhance melt strength and reduce drooling can be use alone on in any combination with the high Tg PC and HALS. An additive manufacturing process may be sensitive to drool which will mar the part and prevent uniform build of the subsequent layers. The build material and the support resins both thus may suitably have sufficient melt strength and thermal stability to prevent drool or string formation. Strings are attenuated filament strands that bridge the part and moving nozzle.

Exemplary Additives

The polymer compositions of the disclosure may also comprise additives, as desired. Exemplary additives include: one or more polymers, heat stabilizers, anti-drip agents, pigments, dyes, fibers, fillers, plasticizers, fibers, flame retardants, antioxidants, lubricants, glass, and metals, and combinations thereof.

Exemplary polymers that can be mixed with the compositions of the disclosure include elastomers, thermoplastics, thermoplastic elastomers, and impact additives. The compositions of the disclosure, both build and support resins, may be mixed with other polymers such as a polyester, a polyestercarbonate, a bisphenol-A homopolycarbonate, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, polyacrylonitrile, a polystyrene, a polyolefin, a polysiloxane, a polyurethane, a polyamide, a polyamideimide, a polysulfone, a polyphenylene ether, a polyphenylene sulfide, a polyether ketone, a polyether ether ketone, a polyphenylsulfone, a poly(alkenylaromatic) polymer, a polycarbonate, a liquid crystal polymer, an ethylene-tetrafluoroethylene copolymer, an aromatic polyester, a polyvinyl fluoride, a polyvinylidene fluoride, tetrafluoroethylene, or any combination thereof.

The additional polymer can be an impact modifier, if desired. Suitable impact modifiers may be high molecular weight elastomeric materials derived from olefins, monovinyl aromatic monomers, acrylic and methacrylic acids and their ester derivatives, as well as conjugated dienes that are fully or partially hydrogenated. The elastomeric materials can be in the form of homopolymers or copolymers, including random, block, radial block, graft, and core-shell copolymers. However, such rubbery modifiers, and other additives suitably have sufficient thermal stability to survive the high melt processing temperature (>250° C. and is some instances >300° C.) of the PC-HALS mixing (pelletization), filament manufacture and a final MFD build process.

The compositions of the disclosure may comprise heat stabilizers. Exemplary heat stabilizer additives include, for example, hindered phenols and organophosphites such as tris-(2,6-dimethylphenyl)phosphite, tris-(mixed mono- and di-nonylphenyl)phosphite or the like; phosphonates such as dimethylbenzene phosphonate or the like or combinations thereof. Stabilizers with a molecular weight above 300 g/mol may be preferred due to their lower volatility in a high Tg polymer melt.

The compositions of the disclosure may comprise anti-drip agents. The anti-drip agent may be a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. These anti-drip additives may be useful in building low shear viscosity and increasing melt strength to prevent filament drooling during a MFD part build.

The term "pigments" means colored particles that are insoluble in the resulting compositions of the disclosure. Exemplary pigments include titanium oxide, carbon black, carbon nanotubes, metal particles, silica, metal oxides, metal sulfides or any other mineral pigment; phthalocyanines, anthraquinones, quinacridones, dioxazines, azo pigments or any other organic pigment, and mixtures of pigments and dyes. The pigments may represent from 0.005% to 15% by weight relative to the weight of the overall composition.

The term "dye" refers to molecules that are soluble in the compositions of the disclosure and that have the capacity of absorbing part of the visible radiation. The composition can comprise pigments, dyes and other colorants and any combination thereof.

Exemplary fibers include glass fibers, carbon fibers, metal fiber or any mixture thereof.

Suitable fillers for the compositions of the disclosure include: silica, clays, carbon black, and whiskers. Other possible fillers include, for example, silicates and silica powders such as aluminum silicate (mullite), synthetic calcium silicate, zirconium silicate, fused silica, crystalline silica graphite, natural silica, or the like; boron powders such as boron-nitride powder, boron-silicate powders, or the like; oxides such as $TiO_2$, aluminum oxide, magnesium oxide, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate, or the like; kaolin, including hard kaolin, soft kaolin, calcined kaolin, kaolin comprising various coatings known in the art to facilitate compatibility with the polymeric matrix, or the like; single crystal fibers or "whiskers" such as silicon carbide, alumina, boron carbide, iron, nickel, copper, or the like; fibers (including continuous and chopped fibers) such as carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, organic fillers such as polytetrafluoroethylene; reinforcing organic fibrous fillers formed from organic polymers capable of forming fibers with a meting point greater than 350° C., such polybenzoxazole, aromatic polyimides, polytetrafluoroethylene, or the like; as well as additional fillers and reinforcing agents. Plasticizers, lubricants, and mold release agents can be included.

Mold release agent (MRA) may also be used to encourage quick and efficient material removal. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetra stearate (PETS), and the like. In some instances the release content may be from 0.3 to 1.0 wt %. Higher release content may allow easier separation of the sacrificial support material from the build resin in parts made by fused filament deposition and other additive manufacturing techniques.

Various types of flame retardants can be utilized as additives. In one aspect, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NaTs) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of sulfonic acids. Rimar salt and KSS and NaTs, alone or in combination with other flame retardants, are particularly useful in the compositions disclosed herein. In certain aspects, the flame retardant does not contain bromine or chlorine.

The flame retardant additives may include organic compounds that include phosphorus, bromine, and/or chlorine. In certain aspects, the flame retardant is not a bromine or chlorine containing composition. Non-brominated and non-chlorinated phosphorus-containing flame retardants can include, for example, organic phosphates and organic compounds containing phosphorus-nitrogen bonds. Exemplary di- or polyfunctional aromatic phosphorus-containing compounds include resorcinol tetraphenyl diphosphate (RDP), the bis(diphenyl) phosphate of hydroquinone and the bis (diphenyl) phosphate of bisphenol-A, respectively, their oligomeric and polymeric counterparts, and the like. Other exemplary phosphorus-containing flame retardant additives include phosphonitrilic chloride, phosphorus ester amides, phosphoric acid amides, phosphonic acid amides, phosphinic acid amides, tris(aziridinyl) phosphine oxide, polyorganophosphazenes, and polyorganophosphonates.

Exemplary antioxidant additives include organophosphites such as tris(nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants.

Exemplary Aspects

The following aspects are illustrative only and do not limit the scope of the present disclosure or the claims attached hereto.

Aspect 1. A method, comprising: with an additive manufacturing process (including but not limited to a fused deposition process and a fused filament fabrication process), forming a workpiece that comprises a build portion comprising polyetherimide, polyetherimide sulfone, polyimide, polysulfone, polyether sulfone, polyphenylene ether sulfone, polyphenylene ether, imidized polymethacrylate, blends thereof, or any combination thereof, and a degradable support portion contacting the build portion, the degradable support portion comprising a thermoplastic polycarbonate and a hindered amine light stabilizer.

The methods suitably include exposing the workpiece to water at 100° C. or greater for a sufficient time (e.g., at least 1 hour, or at least 2 hours, or at least 3 hours) so as to selectively degrade at least a region of the degradable support portion; and removing from the workpiece the selectively degraded region of the degradable support portion. Higher temperatures, e.g., 120 to 180° C. in the presence of water, will accelerate decomposition of the high Tg HALS support allowing removal in shorter time (the exact time will depend on the structure and thickness of the MFD part and the support). The autoclave temperature is suitably not so high that it distorts the build resin parts; in some instances this may be at least 10° C. below the Tg of the build resin.

As one illustrative example, the disclosed methods may include using a filament additive manufacturing process to construct a curvilinear part comprising at least 10 contiguous layers comprising a thermoplastic resin wherein the curvilinear part is supported by a supporting scaffold contacting the curvilinear part. The scaffold may be, but does not have to be, produced at the same time as the curvilinear part.

The part may be made of a comparatively high Tg (e.g., 150 to 280° C.) resin comprising a polyetherimide, polyimide, polysulfone, polyether sulfone, polyphenylene ether sulfone, polyphenylene ether, polycarbonate, blends thereof, or any mixture containing one or more of such resins. The support scaffold may comprise a mixture of any of the following support resins; polycarbonates, polyester carbonates, isophorone polycarbonates or polyisoindolinone polycarbonates, the support resin suitably having a Tg of greater than 150° C. (e.g., Tg >175° C.), and also comprising from about 0.1 to about 10.0 wt % HALS with a Mw >200 g/mol. In other aspects After the part and support scaffold are completed, the user may expose the part-scaffold assembly to water at over 100° C. (e.g., for 1, hour, 2 hours or 3 or more hours) resulting in selective degradation of the scaffold material. This degradation may be followed by removal of the degraded scaffold material from the part with either; mechanical agitation, brushing, washing, fluidized bed immersion, tumbling, for example with a hard particulate material, water or air spray (for example at high pressure), ultrasonic agitation, (for example using an ultrasonic bath), heating or cooling or any combination thereof. In some instances the part may be cooled to room temperature (23° C.) or below before removing all of the degraded scaffold material. In some other instances, it may be possible to recover the HALS after removal of the support resin. One route to such a HALS recovery is extraction of the degraded support resin residue with an organic solvent and aqueous acid. In some aspects the scaffold material may fall away or otherwise detach from the part automatically and will not require manual removal.

Aspect 2. The method of aspect 1, wherein the workpiece is according to any of aspects 21-38.

Aspect 3. The method of any of aspects 1-2, further comprising incorporating a reinforcing fiber into the build portion. The reinforcing fiber may comprise fibers of the same composition, length, and diameter, but may also comprise fibers that differ from one another in one or more of the foregoing characteristics.

Aspect 4. The method of aspect 3, wherein the reinforcing fiber comprises glass fiber, carbon fiber, metal fibers or any combination thereof.

Aspect 5. The method of any of aspects 1-4, wherein the water is in vapor form. The water may be in steam or even in superheated steam form. As described elsewhere herein, autoclaves are considered particularly suitable water applicators.

Aspect 6. The method of any of aspects 1-5, wherein the water further comprises a base.

Aspect 7. The method of aspect 6, wherein the base comprises a C2 to C30 amine. Morpholine, cyclohexyl amine (CHA) and diethyl amino ethanol (DEAE) or mixtures thereof are considered particularly suitable amines are, methoxy propyl amine, mono ethanol amine, dimethyl propyl amine and diethyl amino ethanol. Mixtures of the foregoing are also considered suitable. Other water/steam additives comprise ammonia and ammonium hydroxide. Amines as water/steam additives may be present at 1 to 1000 parts per million (ppm).

Aspect 8. The method of any of aspects 1-7, wherein the removing comprises mechanical agitation, brushing, washing, fluidized bed immersion, tumbling, fluid spray, ultrasonic agitation, heating, cooling, or any combination thereof.

Application of ultrasound energy is considered a particularly suitable removal technique. Ultrasound alone or in combination with other agitation may be applied during or after water/steam application.

Aspect 9. The method of any of aspects 1-8, wherein at least part of the build portion is formed by fused deposition of a molten build filament, wherein at least part of the support portion is formed by fused deposition of a molten support filament, or both.

Fused deposition is known to those of ordinary skill in the art, and is described elsewhere herein. At a general level, fused deposition works on an "additive" principle by laying down material in layers; a plastic filament or metal wire is unwound from a coil and supplies material to produce a part.

The material may be deposited according to a preset schedule of locations, e.g., according to a computer file that directs the type, amount, and location of material being dispensed. Fused deposition may be accomplished by sequential dispensing of the build and support materials or even by simultaneous dispensing of these materials.

Aspect 10. The method of aspect 9, wherein at least one of the build filament and the support filament has a diameter of from about 0.1 to about 5.0 millimeter (mm), e.g., from about 0.5 to about 4.5 mm, from about 1.0 to about 4.0 mm, from about 1.5 to about 3.0 mm, from about 1.5 to about 3.5 mm, from about 2.0 to about 3.0, or even about 2.5 mm.

Aspect 11. The method of any of aspects 9-10, wherein the variation along the filament diameter is less than or equal to about 10% of the filament diameter.

Aspect 12. The method of any of aspects 1-11, wherein the exposing effects a reduction in the molecular weight of the support portion of from about 50% to about 95%.

Aspect 13. The method of aspect 12, wherein the exposing effects a reduction in the molecular weight of the support portion of from about 75% to about 85%.

Aspect 14. The method of any of aspects 1-13, wherein removal of the selectively degraded region of the degradable support portion gives rise to a workpiece having a hollowed portion. This may be, for example, in an aspect where one or more layers of the build material is disposed atop a solid cone of the support material, following which the support material is removed so as to leave behind a hollow, cone-shaped shell of the build material.

Aspect 15. The method of aspect 14, wherein the hollowed portion has a non-uniform cross-sectional dimension. This may be, for example, where the support material is formed as a series of connected spheres, the build material is disposed atop the spheres, and then the support material is removed, leaving behind a shell of build material with a hollowed portion inside that corresponds to the connected-sphere structure of the now-removed support material.

Aspect 16. The method of aspect 15, wherein the hollowed portion is characterized as tapered. One example of this is provided above, where one or more layers of the build material is disposed atop a solid cone of the support material, following which the support material is removed so as to leave behind a hollow, cone-shaped shell of the build material.

Aspect 17. The method of aspect 16, wherein the hollowed portion is characterized as having an internal waist. One such example is an hourglass-type profile. This may be accomplished by, e.g., forming a support structure of two cones connected together at their apices. An amount (e.g., one or more layers) of build material is disposed over the two cones, the support material is removed, and the resultant build material contains within it an hourglass-shaped (i.e., internally waisted) void that corresponds to the now-removed support material.

Aspect 18. The method of any of aspects 1-17, wherein removing from the workpiece the selectively degraded region of the degradable support portion gives rise to a mold formed of the build portion. Such a mold may be used to form subsequent articles.

Aspect 19. The method of aspect 18, further comprising (1) placing a curable material into contact with at least a portion of the mold such that the curable material conforms to the at least a portion of the mold and (2) curing the curable material.

Aspect 20. The method of aspect 19, wherein the curable material comprises one or more of an epoxy resin, an acrylic, a polyurethane, a polyurea, a vinyl ether, a vinyl ester, a silicone, an unsaturated polyester, or any combination thereof. The curable material may, of course, take on the shape of the mold that the material contacted.

Aspect 21. A workpiece, comprising: a build portion comprising polyetherimide, polyetherimide sulfone, polyimide, polysulfone, polyether sulfone, polyphenylene ether sulfone, polyphenylene ether, imidized polymethacrylate, blends thereof, or any combination thereof and a steam degradable support portion contacting the build portion, the degradable support portion comprising a polycarbonate with a Tg from about 150 to about 280° C. and comprising from about 0.1 to about 10.0 wt % hindered amine light stabilizer.

In some aspects the degradable support portion comprises a polycarbonate having a Tg of from 130 to 280° C., and/or comprises from about 0.1 to about 3.0 wt % hindered amine light stabilizer. In yet further aspects the degradable support portion comprises a polycarbonate including from about 0.2 to about 1.0 wt % hindered amine light stabilizer, or from about 0.3 to about 0.7 wt % hindered amine light stabilizer.

Aspect 22. The workpiece of aspect 21, wherein the degradable polycarbonate support portion has a melt viscosity from 1000 to 20,000 poise (P) as measured as per ASTM D4440-15 (15 radians/second (sec.)) at a temperature that is at least 130° C. above the Tg of the support portion, the degradable support portion further retaining at least 60% of the initial melt viscosity after 10 minutes of exposure at that melt temperature. In further aspects the degradable support portion has a melt viscosity of from 1000 to 20,000 poise (P) as measured as per ASTM D4440-15 (15 radians/second) at a temperature that is from 130° C. to 240° C. above a temperature that corresponds to a Tg of the degradable support portion, and retains at least 60% of the initial melt viscosity after 10 minutes of exposure at that melt temperature.

Aspect 23. The workpiece of any of aspects 21-22, wherein the degradable support portion has a molecular weight and wherein the support degradable portion loses (i.e., experiences a reduction of) at least 70% of its molecular weight after 6 hours of exposure to steam at about 120° C.

Aspect 24. The workpiece of any of aspects 21-23, wherein the build portion has a molecular weight and wherein the build portion retains at least 70% of its molecular weight after 6 hours of exposure to steam at about 120° C.

Aspect 25. The workpiece of any of aspects 21-24, wherein the workpiece further comprises from about 5 to about 80 wt % of a reinforcing fiber disposed within the build portion.

Aspect 26. The workpiece of aspect 25, wherein the reinforcing fiber comprises glass fiber, carbon fiber, metal or any combination thereof.

Aspect 27. The workpiece of any of aspects 21-26, wherein the polycarbonate comprises an isoindolinone bisphenol polycarbonate copolymer, a polyester carbonate copolymer, a trimethyl cyclohexyl bisphenol carbonate copolymer, a tetrabromo bisphenol A polycarbonate copolymer, blends thereof, or any combination thereof Aspect 28. The workpiece of any of aspects 21-27, wherein the degradable polycarbonate support portion has a molecular weight of more than about 10,000 Daltons (polycarbonate standard).

Aspect 29. The workpiece of any of aspects 21-28, wherein the degradable support portion has a level of phenolic end groups that is less than about 100 ppm before autoclaving.

Aspect 30. The workpiece of any of aspects 21-29, wherein the degradable support portion has a molecular weight of from about 13,000 to about 80,000 Daltons (polycarbonate standard), before autoclaving.

Aspect 31. The workpiece of any of aspects 21-30, wherein the degradable support portion has a level of halogen that is less than about 500 ppm, preferably less than about 100 ppm, before autoclaving.

Aspect 32. The workpiece of any of aspects 21-31, wherein the hindered amine light stabilizer has a formula molecular weight of greater than about 200 g/mol. The HALS may have a formula molecular weight of from about 200 to about 300 g/mol, e.g., 200, 210, 220, 230, 240, 250, 260, 270, 280, 290, or even 300 g/mol (and all intermediate values).

Aspect 33. The workpiece of any of aspects 21-32, wherein the hindered amine light stabilizer has a pKa in water of from about 7.0 to about 10.0, preferably about from 7.5 to about 9.0.

Aspect 34. The workpiece of any of aspects 21-33, wherein the build portion has a molecular weight of at least about 18,000 Daltons (polycarbonate standard).

Aspect 35. The workpiece of any of aspects 21-34, wherein the build portion and the sacrificial scaffold include small voids resulting from folding of the filament build layers with incomplete fusing of the adjacent layers. A void may have a cross-sectional dimension (e.g., diameter, width) of less than 1 mm. A void may be spherical, but may also be nonspherical in shape. A void may have an angular feature, e.g., a corner. Voids may comprise from about 0.3 to about 5.0 volume % (vol. %) of a workpiece, in some aspects.

Aspect 36. The workpiece of any of aspects 21-35, wherein the degradable portion is at least partially disposed within the build portion. As one example, the build portion may include one or more designed cavities, into which cavity is disposed some of the support portion material wherein the support resin upholds the build part from sagging or distortion at build temperatures above 120° C. A cavity may be defined by an amount of support material, which amount of support material is then removed following part manufacture.

Aspect 37. The workpiece of any of aspects 21-36, wherein the build portion, the degradable support portion, or both, comprises a plurality of layers. As described elsewhere herein, fused deposition methods (e.g., fused deposition modeling) may be operated in a layer-wise fashion so as to disposed successive layers of material.

Aspect 38. The workpiece of any of aspects 21-37, wherein the support portion has a flexural modulus of from about 100 to about 400 kilopounds per square inch (Kpsi), using ASTM D790/3.2 mm thickness.

Aspect 39. A filament comprising a polycarbonate and a hindered amine light stabilizer.

Aspect 40. The filament of aspect 39, wherein the filament comprises from 0.1 to 3 wt % hindered amine light stabilizer.

Aspect 41. The filament of aspect 39 or 40, wherein
a) the hindered amine light stabilizer has a formula molecular weight of 200 to 10,000 grams per mole (g/mol);

(b) the hindered amine light stabilizer has a pKa in water of from 7.0 to 10.0; or (c) both (a) and (b).

Aspect 42. The manufactured filament of any of aspects 39-41, wherein the hindered amine light stabilizer comprises a 2,2,6,6,-tetramethyl-4-piperidyl functionality, for example a bis(2,2,6,6,-tetramethyl-4-piperidyl) sebaceate.

Aspect 43. The filament of any of aspects 39-42, wherein the filament has a diameter of from 1.5 to 3.0 millimeter (mm).

Aspect 44. A degradable support structure comprising a plurality of layers of additively manufactured material, the plurality of layers of additively manufactured material comprising a polycarbonate and a hindered amine light stabilizer.

Aspect 45. The degradable support structure of aspect 44, wherein the plurality of layers of additively manufactured material comprise 0.1 to 3.0 wt % hindered amine stabilizer.

Aspect 46. The degradable support structure of aspect 44 or 45, wherein:

a) the hindered amine light stabilizer has a formula molecular weight of 200 to 10,000 grams per mole (g/mol);

(b) the hindered amine light stabilizer has a pKa in water of from 7.0 to 10.0; or (c) both (a) and (b).

Aspect 47. The degradable support structure of any of aspects 44-46, wherein at least a region of the degradable support structure is selectively degradable when exposed to water at a temperature of from 85 to 280° C. for a time of from 1 to 3 hours.

Aspect 48. The degradable support structure of any of aspects 44-47, wherein the degradable support structure is a sacrificial tooling article or trapped mold for use in composite tooling applications, and the sacrificial tooling article or trapped mold is used to make a hollow composite structure, duct, tube or hollow structural member.

Trapped tools, i.e., tools used to provide support on the inside walls of hollow parts, can present part designers with the problem of tool removal following curing. Sacrificial tools can be used in such instances, in which composite laminated structures are laid up on or around a sacrificial tool and then cured. The tool is subsequently dissolved or removed. Sacrificial tooling may be particularly useful in applications requiring hollow, seamless, complex, one-piece composite structures, for parts that require good internal surface finish, for low part volumes (1 to 100 s), in parts that will not be affected by high coefficient of thermal expansion (CTE) tooling, and for parts that require a short lead time. Various parts may be made using sacrificial tooling principles, including but not limited to: complex hollow composite parts; ducts and tubing; tanks and reservoirs; and tubular or hollow structural members. Another term for composite or sacrificial tooling is "trapped molds," which can include hollow composites, removable cores, soluble materials, and collapsible materials. Degradable support structures including polycarbonate and a hindered amine light stabilizer as described herein can be used for fabrication of composite parts; for example using epoxy, phenolic thermoset, novolac resins, polyurethane or isocyanate cured resins including cured thermoset materials.

EXAMPLES

The following examples are illustrative only and do not serve the limit the scope of the present disclosure or the claims attached hereto.

Example 1

The following experimental work was done to show that with added HALS, a high Tg polycarbonate had sufficient melt stability to extrude the ingredients, form filaments of controlled diameter and then build support structures. After these three heat histories the PC-HALS composition was then decomposed by steam or hot water to allow facile removal of the embrittled support from the model resin. The examples also show that under water (e.g., steam) exposure the model resin (sometimes itself a polycarbonate blend) is not decomposed by contact with the PC-HALS support during steam exposure.

An isoindolinone bisphenol-BPA copolymer (termed "copolymer" for purposes of these Examples) with a Tg of 185° C. was extruded at 380° C., 400 rpm on a co-rotating twin screw extruder as a control. In a second blend 0.5 wt % bis(2,2,6,6-tetramethyl-4-piperidinyl) sebacate HALS was added to the copolymer to make copolymer-HALS, in pellet form. The pellets were then molded into tensile bars, and the molded bars were autoclaved for up to 24 hours (hrs.). After 5 hrs. of autoclaving in steam at 115° C., visible cracks were observed in the copolymer-HALS sample. After 10 hrs. of autoclaving, the sample became very brittle and was easily breakable by hand. After 24 hrs. of autoclaving, a sample of the copolymer with no HALS retained its bar shape and was essentially clear and very difficult to break; a sample of copolymer-HALS that had been autoclaved for 24 hrs. had disintegrated into small pieces and was discolored.

Table 1 below illustrates the molecular weight of PPPBP/BPA copolycarbonate-HALS (0.5 wt % HALS) samples after those blends were autoclaved at 115° C. for 0, 2, 5, 10, and 24 hrs. Molecular weights (Mw) of 15,000 and lower will be very brittle and easily broken. At very low Mw (<10,000) resins are very brittle and have lower Tgs and may just fall away from the part with no mechanical action.

TABLE 1

Molecular Weights (Mw) after Autoclave Steam Exposure at 115 C

| Sample (Hrs. of 115° C. Steam Autoclave Exposure) | Molecular Weight (Mw) |
|---|---|
| Copolymer no HALS 0 h | 22,659 |
| Copolymer w 0.5% HALS (0 h) | 18,306 |
| Copolymer w 0.5% HALS (2 h) | 13,924 |
| Copolymer w 0.5% HALS (5 h) | 10,230 |
| Copolymer w 0.5% HALS (10 h) | 4,571 |
| Copolymer w 0.5% HALS (24 h) | 3,056 |

The compositions of the copolymer (Control A) and copolymer-HALS (Ex. 1) samples are provided below in Table 2:

TABLE 2

Exemplary Formulations

| Item Description | Control A Copolymer | Example 1 Copolymer-HALS |
|---|---|---|
| PPPBP/BPA copolycarbonate (25K Mw) High heat PC | 82 | 82 |
| BPA polycarbonate (30K Mw) | 9 | 9 |
| BPA polycarbonate (22.5K Mw) | 9 | 9 |
| PENTAERYTHRITOL TETRASTEARATE | 0.27 | 0.27 |
| HINDERED PHENOL ANTI-OXIDANT | 0.04 | 0.04 |

TABLE 2-continued

Exemplary Formulations

| Item Description | Control A Copolymer | Example 1 Copolymer-HALS |
|---|---|---|
| Tris(di-t-butyl phenyl)phosphite | 0.08 | 0.08 |
| HALS (Tinuvin ® 770) | | 0.5 |

Pentaerythritol tetra stearate (PETS, CAS Number 115-83-3) is a high molecular weight (1202) ester mold release agent. The high molecular weight (1178) hindered phenol antioxidant is pentaerythritol tetrakis(3-(3,5-di-tert-butyl-4-hydroxyphenyl)propionate) CAS Number. 6683-19-8. The high molecular weight (647, CAS Number 31570-04-4) triaryl phosphite stabilizer is tris (di-t-butyl phenyl) phosphite. Note that these high molecular weight non-fugitive additives in combination do not cause any significant PC copolymer hydrolytic molecular weight loss compared to the same formulation with the lower molecular weight (Mw 481) HALS (Tinuvin® 770=bis(2,2,6,6,-tetramethyl-4-piperidyl)sebacate, CAS number 52829-07-9), which shows rapid hydrolytic degradation of the polycarbonate.

The mechanical properties of the copolymer and copolymer-HALS materials are provided below in Table 3. Test specimens were injection molded in accordance with ASTM test methods using an injection-molding machine operating at a melt temperature of 270 to 310° C. and a mold temperature of 90° C. and having a 30-second cycle time. As is well known fused filament fabrication or deposition additive manufactured parts may have different properties depending on the exact way in which they are built. All injection-molded samples were conditioned for at least 48 hrs. at 50 percent relative humidity (RH) prior to testing.

Physical properties were measured according to ASTM test methods, using the following tests and test methods, as described below. Melt volume-flow rate (MVR) was run on dried pellets in accordance with ASTM D1238 at 330° C. under a 2.16 kilogram load. MVR was measured as cubic centimeters per 10 minutes (cc/10 minutes) at 6-minute equilibration times. Higher values indicate higher melt flow. Tensile properties were measured on 7.5×⅛ inch injection molded parts according to ASTM D638, and are reported in units of megapascals (MPa). Tensile modulus was measured as tangent and tensile elongation is reported at break. Crosshead speed was 50 millimeters per minute. Notched Izod (NI) impact strength was measured according to ASTM D256 using a 5 pound hammer on 2.5×½×⅛ inch injection molded bars. The glass transition temperature (Tg) was measured using differential scanning calorimetry (DSC) as per ASTM method D3418 at a 20° C./min, heating rate. Tg was recorded on the second heat.

TABLE 3

Mechanical and Physical properties of Copolymer (Control A) and Copolymer with HALS (Ex. 1)

| | Tg (° C.) | MVR (330° C./2.16 Kg) cc/10 min. | NI (J/m) | Tensile Modulus (MPa) | Elong. At break (%) |
|---|---|---|---|---|---|
| Control A Copolymer | 183.9 | 24.7 | 84.5 | 2456 | 36 |
| Example 1 Copolymer-HALS | 180.2 | 84.6 | 54.9 | 2578 | 4 |

FIG. 1 attached hereto provides exemplary melt stability studies at 330° C. As shown, the exemplary copolymer exhibited a viscosity change of about −11% over the illustrated time scale; the exemplary copolymer-HALS sample exhibited a viscosity change of about 112% over the same time period. Viscosity vs. time, also known as melt dwell or time sweep, was run using a parallel plate/cone-plate fixture rheometer at 330° C. for 30 minutes at 10 radians/sec. under nitrogen as per ASTM D4440. Viscosity at the onset (after a 6 minute equilibration) and end of the test (30 minutes after equilibration) were compared to show the relative stability of the molten polymer. Viscosity was measured as poise (P). Note that though the HALS additive lowers initial melt viscosity the change in viscosity vs. time is low (less than 1000 poise) indicating the HALS blends (as we observed) will be stable when forming filaments and while being formed into support structures. Good melt stability reduces variation in filament diameter, as a high variation leads to inconsistent parts. No gas generation or foaming was observed in this test of the HALS PC blends. Note that the HALS blend did not drop viscosity after 30 minutes at 330° C., which was consistent with no major loss of Mw.

Example 2

An exemplary PEI-PC blend build material ULTEM 9085 was autoclaved at 115° C. for 2, 5, and 24 hrs. The molecular weight of those samples is shown below at Table 4; observe that neither the PC nor PEI resin of the blend with no HALS showed any appreciable loss of Mw after 24 hrs. 115° C. steam exposure.

TABLE 4

Mol. wt. of PEI-PC blend vs. time. after 115° C. steam autoclaving Hrs. Seam Exposure at 115° C.

| ULTEM 9085 Control B | PC Mw | PEI Mw |
|---|---|---|
| ULTEM 9085—0 hrs | 29,550 | 31,300 |
| ULTEM 9085—2 h | 28,840 | 31,000 |
| ULTEM 9085—5 h | 29,130 | 30,830 |
| ULTEM 9085—24 h | 28,410 | 29,960 |

The table above shows the PC and PEI weight average molecular weight (Mw) of a build resin ULTEM 9085 (a PEI-BPA-PC blend) after autoclave exposure. The high retention of Mw for both the PC and PEI of the build resin show that neither portion of the blend is decomposing under conditions where the high Tg HALS support resin has deteriorated.

Several sacrificial support materials based on isoindolinone polycarbonate copolymers (PPPBP/BPA PC) listed in Table 5 were extruded into 1.78 mm diameter strands, with a variation in diameter of less than 10%. The materials all had a Tg greater than 170 C (as determined by ASTM method D3148-15 with a 20° C. heating rate). They also had good thermal stability, no fugitive additive emissions, with a TGA onset of weight loss above 400° C. TGA was run under nitrogen gas as per ASTM E1131-08, at a heating rate of 20° C. per minute. The support resins also had melt flow (MVR) of at least 40 cc/10 min. at 330° C. with a 2.16 Kg weight, with a weight average molecular weight (Mw) determined by gel permeation chromatography using PC standards of at least 18,000. Examples with higher levels (0.5 and 0.7 wt %) of HALS gave faster PC/PC copolymer degradation when exposed to steam. A higher level (1.0 wt %) of PETS release (Ex. 6 and 7) was used to give better release (easier separation) of the build and sacrificial support structures.

TABLE 5

Sacrificial Support Compositions

| Examples | A | 2 | 3 | 4 | 5 | 6 | 7 |
|---|---|---|---|---|---|---|---|
| PPPBP/BPA copolycarbonate (25K Mw) | 82 | 82 | 82 | 82 | 82 | 82 | 82 |
| BPA-PC (22.5K Mw) | 9 | | | | | | |
| BPA PC (30K Mw) | 9 | 18 | 18 | | | 18 | 18 |
| Branched BPA PC (37 Mw) | | | | 18 | 18 | | |
| Pentaerythritol Tetrastearate (PETS) | 0.27 | 0.27 | 0.27 | 0.27 | 0.27 | 1.00 | 1.00 |
| Hindered Phenol Antioxidant (IRGANOX 1010) | 0.04 | 0.04 | 0.04 | 0.04 | 0.04 | 0.04 | 0.04 |
| Tris di-t-butyl phenyl phosphite | 0.08 | 0.08 | 0.08 | 0.08 | 0.08 | 0.08 | 0.08 |
| HALS | | 0.30 | 0.50 | 0.30 | 0.50 | 0.50 | 0.70 |
| Tg ° C. (20° C./min heating rate) | 183.9 | 181.3 | 181.3 | 180.7 | 180.1 | 179.0 | 179.0 |
| Initial Mw (polycarbonate standard) | 22849 | 22248 | 20918 | 22203 | 21471 | 20865 | 20637 |
| MVR (330° C., 2.16 kg) cc/10 min | 24.7 | 42.6 | 56.6 | 42.9 | 60.6 | 90.3 | 123.0 |
| TGA wt. loss onset C. (N2) (20° C./minute heating rate) | 493 | 501 | 500 | 490 | 457 | 491 | 470 |

The filaments were formed into a series of test parts constructed on a Stratysys Fortus 400 or 900 printer using a fused filament fabrication technique. Parts were made using the ULTEM 9085 blend or ULTEM 1010 as the build (model) resin with the PC-HALS as supports. Due to attenuation of the filament, during part build the final layers were about 0.3 mm. The bars were fabricated with a nozzle filament extrusion temperature using custom model and support temperatures for ULTEM 9085 profile of 385 to 390° C. for model material and about 420° C. for support material with an oven temperature of 185° C. The filament additive manufactured parts were characterized by optical microscopy and found to have more than 1 vol. % voids and that more than 80 vol. % of the voids were high aspect voids with a length to diameter ratio of greater than 1. At least 20 vol. % of the voids had an acute cusp angle of 60 degrees or less. The parts had at least 5 layers and comprised a build part and a sacrificial portion made of a polycarbonate copolymer containing from 0.3 to 0.7% HALS. The model part (build layer) and HALS containing sacrificial support portion were in direct contact with each other. Rectangular parts of model and support layers were 153 mm long by 26 mm wide and had 6 layers of build resin and 6 layers of sacrificial support resin. In some constructions the sacrificial layer was sandwiched in between two ULTEM 9085 build layers. In other constructions an ULTEM 9085 interior layer was sandwiched between two sacrificial HALS-PPPBP/BPA polycarbonate copolymers layers. The part layers in some instances used a two-strand perimeter construction with alternate layers placed at a 45-degree angle to fill the interior of the part with a X pattern. This 45×135 (degree) X pattern has the first layer deposited at a 45-degree angle to the long axis of the bar. The next layer is deposited at a 135-degree angle to the long axis making an X type crossing pattern with alternating layers orthogonal to each other. From above they gave a diamond pattern under magnification. In other experiments an X pattern crossing construction of alternate layers with no perimeter was used. Parts were printed in flat orientation in lap shear geometry with 1-inch overlap or as sandwich parts explained above.

After removal from the printing machine the parts comprising model (build) layers and sacrificial support layers comprising a PC with HALS (Example 3) were exposed to steam at 115° C. for 5 to 7 hrs. After steam exposure in an autoclave the model part (build layers) were unaffected, the HALS containing sacrificial supports had degraded and lost over half of their initial molecular weight, the support was brittle and could be easily broken away from the part. Some of the sacrificial layer had fallen away from the model part in the autoclave during steam exposure. The remaining sacrificial layer was removed by mechanical action. In some experimental samples all of the sacrificial layer was removed. In all examples at least 70% of the sacrificial layer was removed. All of the sacrificial HALS blend of Table 5 were tested in a similar manner, giving comparable results. Higher levels of HALS (0.5% and 0.7%, Examples 3, 5, 6 and 7) provided for faster degradation of the support resin in steam, and higher levels (1%) of PETS (examples 6 and 7) allowed for somewhat easier release from the build layers.

Note that if HALS content was too high the viscosity of the support strand was too low and it did not have sufficient melt strength and broke or underwent too much attenuation (thinning) to make an acceptable support structure. Temperature variation may have allowed correction of these issues but is not an option on the Stratasys machines used in these experiments. In any event it may be desirable in some aspects to balance HALS content with PC molecular weight and viscosity to allow good viscoelastic melt properties while still decomposing in steam or hot water in a reasonable time frame (for example 24 hrs. or less). It was found that use of a branched polycarbonate blend (Examples 4 and 5), and in particular with higher HALS content, provided more melt strength (less shear thinning) to the strand that helped with a superior support build with less strand thinning and strand breakage. It still decomposed quickly (less than 12 hrs. for example 5 to 7 hrs.) on exposure to steam. It was found that optimization of PC molecular weight using higher (≥25 K) Mw PC or branched PC and moderate HALS loadings (0.3 to 1.0 wt %) allowed these blends to be used as support materials for PC, ULTEM 9085 or ULTEM 1010 model materials.

In another construction a cylindrical test sample 75 mm long with a diameter of 10 mm was made using a fused filament deposition process on a Stratasys Fortus 900 machine. The cylinder had a 1 mm exterior made of an ULTEM 9085 blend and an 8 mm interior of a HALS blend composition of Example 3. After autoclave steam exposure for 7 hrs. at 115° C. at least 60% of the interior structure was removed by tapping the sample on end giving a hollow tube from the previously solid cylinder. Further support material removal could be achieved with a brush, wire or pick inserted into the tube. It should be noted that formulation of Ex. 3 was also used to print the sandwich parts under standard ULTEM 1010 profile on Fortus 900 mc as a support material for ULTEM 1010 model material. It printed well as an ULTEM 1010 support material and the PC-HALS support could be removed from the ULTEM model material after 5 to 7 hrs. autoclaving at 115° C. with the support Mw dropping from 16000 of as-printed support to 6000 after autoclaving, however the ULTEM model Mw was retained.

Table 6 shows the rapid drop on Mw on autoclaving at 115° C. in steam for the HALS blend of Example 3. The non-HALS Control Example A show much less degradation. Tables 6, 7 and 8 show the Mw drop of Control sample A and HALS blends Ex. 3 and Ex. 7 with 0.5 and 0.7 wt % HALS (bis(2,2,6,6,-tetramethyl-4-piperidyl)sebaceate). At 25 C and 55% Relative Humidity (RH) after 79 days all samples showed good retention of their initial Mw. The 0.5% HALS sample, Ex. 2, has 95.8% retention of initial Mw. Even the high (0.7%) HALS loading of Ex. 7 has 94.2% Mw retention. This indicates little or no degradation, which is desirable in some aspects as it shows that in normal storage the sacrificial support material will keep its useful properties, for example melt viscosity and Tg, that allow support structure build capability. Storage in a moisture impermeable bag, for example an aluminum foil bag, further with appropriate desiccants such as silica gel, was shown to benefit shelf life.

TABLE 6

| Mw vs. Days at 25° C./55% RH | | | |
|---|---|---|---|
| Days at 25° C./ 55% RH Composition | PPPBP/BPA PC Ex. A | 0.5 HALS- 25/55 Ex. 3 | 0.7 HALS- 25/55 Ex. 7 |
| 0 d | 22803 | 18141 | 17007 |
| 3 d | 22780 | 17935 | 16840 |
| 7 d | 22912 | 18304 | 16745 |
| 9 d | 23125 | 18231 | 16957 |
| 15 d | 22625 | 17924 | 16697 |
| 79 d | 22864 | 17378 | 16024 |

At 55° C. and 55% RH (Table 7) for 15 days Mw loss of the HALS blends is still moderate with 84.2 and 79.3% retention of initial Mw.

TABLE 7

| Mw vs. Days at 55° C./55% RH | | | |
|---|---|---|---|
| Days at 55° C./ 55% RH Composition | PPPBP/BPA PC Ex. A | 0.5 HALS- 55/55 Ex. 3 | 0.7 HALS- 55/55 Ex. 7 |
| 0 | 22575 | 17773 | 16637 |
| 3 | 22574 | 16856 | 15463 |
| 7 | 22310 | 15969 | 14355 |
| 9 | 22835 | 15828 | 14304 |
| 15 | 22834 | 14961 | 13185 |

At 85° C. and 55% RH (Table 8) the sacrificial support degradation rate is increasing significantly with only 43.0 and 32.1% Mw retention after 7 days indicating more brittle parts and lower melting polycarbonate oligomers. 7 days may be an undesirably long time to wait for support structure degradation, however, so after exposure to steam at 115° C. (Table 1, 100% RH) after 10 hrs. only 25.0% of initial Mw is retained. Higher temperature steam would be expected to provide even faster HALS-PC support degradation.

TABLE 8

| Mw vs. Days at 85° C./55% RH | | | |
|---|---|---|---|
| Days at 85° C./ 55% RH Composition | PPPBP/BPA PC Ex. A | 0.5 HALS- 85/55 Ex. 3 | 0.7 HALS- 85/55 Ex. 7 |
| 0 | 22803 | 18141 | 17007 |
| 3 | 22531 | 11325 | 9066 |
| 7 | 22226 | 7797 | 5451 |
| 9 | 22527 | 6765 | 2659 |

In an alternate aspect of the disclosure a high Tg (>170° C.) polyester carbonate copolymer (LEXAN 4701 PPC, a BPA copolycarbonate resin with 80 wt % iso and terephthalate ester units) was blended with 0.5% HALS as a sacrificial support. The PPC blends also had the 0.27 wt % PETS release, 0.04 wt % hindered phenol antioxidant and 0.08 wt % triaryl phosphite stabilizer as the compositions of Table 5. A PPC control with no HALS had a Mw retention of 94.7% after 18 hrs. autoclave steam exposure at 115° C. The blend with 0.5% HALS had a Mw retention after 18 hrs. of 61.4%. Another BPA copolycarbonate resin with 60 wt % iso and terephthalate ester units, LEXAN PCE, was also blended with 0.5% HALS as a sacrificial support with the same amount of additives as above. The non-HALS PCE control had a Mw retention after 18 hrs. steam exposure at 115° C. of 90.6% while the blend with 0.5 wt % HALS still retained 71.4% of its initial Mw. While these two high Tg polyester carbonates do show faster decomposition with added HALS they do not show the same extent of decomposition as the high Tg non-ester polycarbonate copolymers. The PPPBP-BPA/PC HALS blend has only 25.0% Mw retention after only 10 hrs. in the steam autoclave at 115° C. While not being bound by any mechanism or mode of action, it may be that the hydrolysis of the high content of ester linkages in the PPC and PCE resins generates significant amounts of carboxylic acids that react with (neutralize) the basic HALS compound to impede its acceleration of the PC support resin degradation in steam. Polycarbonate HALS blends with less 10 wt % ester are preferred for sacrificial supports. In other instances ester content may be less than 2 wt % with 0.3 to 1.0 wt % HALS.

In another set of experiments, a hydrogenated isophorone bisphenol polycarbonate copolymer, APEC 2097 from Covestro Inc. was extruded with 0.5 wt % HALS (Tinuvin® 770) and 1.0% PETS at 330° C. (Example 8). The blend had a MVR at 330° C. w 2.16 kg of 45.6 cc/10 min. with a Tg of 188° C. The weight average molecular weight (Mw) of the blend was 25459 D, similar to the hydrogenated isophorone bisphenol polycarbonate copolymer (Control Example B) that had a Mw of 27869 D. This indicates little degradation of the copolymer with HALS at high temperature with no steam. Upon steam exposure at 115° C. the resins show very different behavior (Table 9). The control Ex. B shows >95% Mw retention even after 24 hrs. steam exposure with good retention of its original mechanical properties. On the other hand the HALS blend (Ex. 8) shows severe degradation, indicating good performance as a sacrificial support resin, dropping Mw to 1039 a 96% reduction. After 6 hrs. steam exposure Mw is reduced by 68% to 10574 D giving a brittle and easily broken material.

TABLE 9

| Hrs. at 115° C./100% RH Composition | APEC 2097 Ex. B | APEC + 0.5 HALS + 1.0 PETS Ex. 8 |
|---|---|---|
| 0 hrs. | 27869 | 25459 |
| 6 hrs. | 27645 | 10574 |
| 24 hrs. | 27362 | 1039 |

What is claimed:

1. A method, comprising:
   with an additive manufacturing process, forming a workpiece that comprises
   a build portion comprising polyetherimide, polyetherimide sulfone, polyimide, polysulfone, polyether sulfone, polyphenylene ether sulfone, polyphenylene ether, imidized polymethacrylate, blends thereof, or any combination thereof, and
   a degradable support portion contacting the build portion, the degradable support portion comprising a thermoplastic polycarbonate and a hindered amine light stabilizer; and
   exposing the workpiece to water at a temperature of from 85 degrees Celsius (° C.) to a temperature that corresponds to a glass transition temperature (Tg) of the build portion for a time sufficient to selectively degrade at least a region of the degradable support portion.

2. The method of claim 1, wherein the water further comprises a base.

3. The method of claim 1, further comprising removing from the workpiece the selectively degraded region of the degradable support portion by mechanical agitation, brushing, washing, fluidized bed immersion, tumbling, fluid spray, ultrasonic agitation, heating, cooling, or any combination thereof.

4. The method of claim 1, wherein the exposing effects a reduction in the molecular weight of the support portion of from 50% to 95%.

5. A workpiece, comprising:
   a build portion comprising polyetherimide, polyetherimide sulfone, polyimide, polysulfone, polyether sulfone, polyphenylene ether sulfone, polyphenylene ether, imidized polymethacrylate, blends thereof, or any combination thereof; and
   a degradable support portion contacting the build portion, the degradable support portion comprising a polycarbonate having a Tg of from 130 to 280° C. and from 0.1 to 3.0 wt % hindered amine light stabilizer.

6. The workpiece of claim 5, wherein the degradable support portion has a melt viscosity of from 1000 to 20,000 poise (P) as measured as per ASTM D4440-15 (15 radians/second) at a temperature that is from 130° C. to 240° C. above a temperature that corresponds to a Tg of the degradable support portion, and retains at least 60% of the initial melt viscosity after 10 minutes of exposure at that melt temperature.

7. The workpiece of claim 5, wherein:
   (a) the degradable support portion has a molecular weight and the degradable support portion loses at least 70% of its molecular weight after 6 hours of exposure to steam at 120° C.;
   (b) the build portion has a molecular weight and the build portion retains at least 70% of its molecular weight after 6 hours of exposure to steam at 120° C.; or
   (c) both (a) and (b).

8. The workpiece of claim 5, wherein the polycarbonate comprises an isoindolinone bisphenol polycarbonate copolymer, a polyester carbonate copolymer, a trimethyl cyclohexyl bisphenol carbonate copolymer, a tetrabromo bisphenol A polycarbonate copolymer, blends thereof, or any combination thereof.

9. The workpiece of claim 5, wherein the degradable support portion has a molecular weight of from 15,000 to 80,000 Daltons (polycarbonate standard).

10. The workpiece of claim 5, wherein:
    (a) the hindered amine light stabilizer has a formula molecular weight of 200 to 10,000 grams per mole (g/mol);
    (b) the hindered amine light stabilizer has a pKa in water of from 7.0 to 10.0; or
    (c) both (a) and (b).

11. A degradable support structure comprising a plurality of layers of additively manufactured material, the plurality of layers of additively manufactured material comprising a polycarbonate and a hindered amine light stabilizer.

12. The degradable support structure of claim 11, wherein the plurality of layers of additively manufactured material comprise 0.1 to 3.0 wt % hindered amine stabilizer.

13. The degradable support structure of claim 11, wherein:
    a) the hindered amine light stabilizer has a formula molecular weight of 200 to 10,000 grams per mole (g/mol);
    (b) the hindered amine light stabilizer has a pKa in water of from 7.0 to 10.0; or
    (c) both (a) and (b).

14. The degradable support structure of claim 11, wherein at least a region of the degradable support structure is selectively degradable when exposed to water at a temperature of from 85 to 280° C. for a time of from 1 to 3 hours.

15. The degradable support structure of claim 11, wherein the degradable support structure is a sacrificial tooling article or trapped mold for use in composite tooling applications, and the sacrificial tooling article or trapped mold is used to make a hollow composite structure, duct, tube or hollow structural member.

* * * * *